US010331320B2

(12) United States Patent
Sudo et al.

(10) Patent No.: US 10,331,320 B2
(45) Date of Patent: Jun. 25, 2019

(54) ELECTRONIC APPARATUS, APPARATUS OPERATION METHOD, AND PROGRAM

(71) Applicant: SONY CORPORATION, Tokyo (JP)

(72) Inventors: Ichiro Sudo, Kanagawa (JP); Tsutomu Shimosato, Kanagawa (JP); Norio Wakatsuki, Kanagawa (JP); Katsuhiko Aihara, Kanagawa (JP); Takuji Moriya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 179 days.

(21) Appl. No.: 14/421,572

(22) PCT Filed: Jul. 18, 2013

(86) PCT No.: PCT/JP2013/004395
§ 371 (c)(1),
(2) Date: Feb. 13, 2015

(87) PCT Pub. No.: WO2014/030290
PCT Pub. Date: Feb. 27, 2014

(65) Prior Publication Data
US 2015/0227303 A1 Aug. 13, 2015

Related U.S. Application Data

(63) Continuation of application No. PCT/JP2013/004395, filed on Jul. 18, 2013.

(30) Foreign Application Priority Data

Aug. 20, 2012 (JP) .................................. 2012-181543

(51) Int. Cl.
G06F 3/0484 (2013.01)
G06F 3/0488 (2013.01)
(Continued)

(52) U.S. Cl.
CPC ........ *G06F 3/04847* (2013.01); *G06F 3/0488* (2013.01); *H04N 5/23206* (2013.01);
(Continued)

(58) Field of Classification Search
CPC ..................... G06F 3/4847; G06F 2203/04806
See application file for complete search history.

(56) References Cited

U.S. PATENT DOCUMENTS

2005/0183040 A1 8/2005 Kondo et al.
2006/0070111 A1* 3/2006 Kurosawa .......... H04N 7/17318
725/105

(Continued)

FOREIGN PATENT DOCUMENTS

EP     2 405 299        1/2012
EP     2405299 A2 *    1/2012    ............. G03B 17/40
(Continued)

OTHER PUBLICATIONS

International Search Report issued in corresponding International Aplication No. PCT/JP2013/004395 dated Aug. 13, 2013.
(Continued)

*Primary Examiner* — Roland J Casillas
(74) *Attorney, Agent, or Firm* — Haug Partners LLP; William S. Frommer (57) ABSTRACT

[Object] To make a preferable operation possible with a simple structure that does not require an operation member with a complicated mechanism.
[Solving Means] A display process of displaying a setting screen for setting one of an adjustment position and a numerical value on the basis of a user operation and a control process of changing one of the adjustment position and the numerical value depending on a change of a position of a knob by the user operation on the setting screen displayed in the display process are included. In the display (Continued)

process, the knob that is moved on the slider by the user operation is displayed, and the position of the knob is set as a default position on the slider, when the user operation is not performed.

13 Claims, 9 Drawing Sheets

(51) Int. Cl.
    *H04N 5/232*     (2006.01)
    *H04N 5/262*     (2006.01)

(52) U.S. Cl.
    CPC ..... *H04N 5/23216* (2013.01); *H04N 5/23293* (2013.01); *H04N 5/2628* (2013.01); *G06F 2203/04806* (2013.01); *H04N 5/23212* (2013.01); *H04N 5/23296* (2013.01)

(56) References Cited

U.S. PATENT DOCUMENTS

| | | | |
|---|---|---|---|
| 2011/0267706 A1 | 11/2011 | Karasawa | |
| 2011/0276879 A1* | 11/2011 | Ando | G06F 3/0488 715/702 |
| 2012/0098854 A1 | 4/2012 | Ohnishi | |
| 2013/0014057 A1* | 1/2013 | Reinpoldt | G06F 3/04883 715/833 |
| 2013/0038546 A1* | 2/2013 | Mineo | G06F 3/167 345/173 |

FOREIGN PATENT DOCUMENTS

| | | | | |
|---|---|---|---|---|
| EP | 2405299 A2 | * | 1/2012 | ............ G03B 17/40 |
| JP | 06-273658 | | 9/1994 | |
| JP | 07-234981 | | 9/1995 | |
| JP | 11-212726 | | 8/1999 | |
| JP | 2001-350579 | | 12/2001 | |
| JP | 2005-321896 | | 11/2005 | |
| JP | 2005321896 A | * | 11/2005 | |
| JP | 2006-338406 | | 12/2006 | |
| JP | 2007-065385 | | 3/2007 | |
| JP | 2007-121492 | | 5/2007 | |
| JP | 2007-228177 | | 9/2007 | |
| JP | 2011-232684 | | 11/2011 | |
| JP | 2011-258152 | | 12/2011 | |
| JP | 2012-090157 | | 5/2012 | |
| JP | 2012-113110 | | 6/2012 | |
| JP | 2013-37556 | | 2/2013 | |

OTHER PUBLICATIONS

Search Report issued in corresponding European Application No. 13830845.7 dated Apr. 11, 2016.
Office Action issued in corresponding Japanese Application No. 2014-531486 dated May 31, 2016.
European Patent Office Action dated Jan. 30, 2018.
Anonymous, "Slider Sample", May 2, 2007, pp. 1-3, XP055442214, URL: https://web.archive.org/web//20070502120025/http://ajax.asp.net:80/ajaxtoolkit/Slider/Slider.aspx (retrieved Jan. 18, 2018).
Office Action issued in corresponding Japanese Application No. 2016-255254 dated Sep. 19, 2017.
Japanese Office Action dated Mar. 27, 2018.

* cited by examiner

ELECTRONIC APPARATUS, APPARATUS OPERATION METHOD, AND PROGRAM

TECHNICAL FIELD

The present disclosure relates to an electronic apparatus such as a video camera, an apparatus operation method for operating an electronic apparatus, and a program for executing an operation of an electronic apparatus.

BACKGROUND ART

Conventionally, in a video camera, a zoom adjustment lever and a focus adjustment lever are provided, and a user operates the levers to make a zoom adjustment and a focus adjustment of a lens.

Typically, a zoom adjustment lever and a focus adjustment lever are each disposed at a midpoint when a user does not touch the levers. When a user presses the lever toward one direction (+ direction), a zoom lens or a focus lens is moved to the direction at a speed corresponding to a pressing force thereof. Further, when a user presses the lever toward the other direction (− direction), the zoom lens or the focus lens is moved to the opposite direction (the other direction) at a speed corresponding to a pressing force thereof.

A video camera as described above which is provided with a zoom adjustment lever and a focus adjustment lever can achieve adjustments of a zoom lens and a focus lens easily by a user by operating the levers.

Patent Document 1 discloses that a zoom adjustment lever is provided to a video camera, and changeable speed zoom is performed on the basis of an operation state of the lever.

Patent Document 1: Japanese Patent Application Laid-open No. HEI6-273658

SUMMARY OF INVENTION

Problem to be Solved by the Invention

For the zoom adjustment lever and the focus adjustment lever, it is necessary to detect an amount of operation at a time of pressing the lever and adjust a drive speed of an adjustment mechanism by a user, so these members have relatively complicated mechanisms. Two buttons for giving an instruction to perform an operation to a + direction and for giving an instruction to perform an operation to a − direction can be arranged and used instead of the levers. However, these two buttons just give on and off instructions for a movement to the + direction and on and off instructions for a movement to the − direction and cannot give an instruction for the speed of driving the zoom lens and the focus lens.

Further, a video camera may be operated with keys or the like disposed on a camera main body by a user or may be externally operated by using a remote controller. In the case where the remote controller is used, if the remote controller is not provided with a lever corresponding to the zoom adjustment lever and the focus adjustment lever, it is impossible to adjust a speed at a time of driving the zoom lens and the focus lens.

It should be noted that the description is given above on the case where the video camera is operated. Various electronic apparatuses capable of being operated with a similar adjustment lever also have similar problems.

An object of the present disclosure is to provide an electronic apparatus which can perform a preferable operation with a simple structure which does not require an operation member having a complicated mechanism, and provide an apparatus operation method and a program.

Means for Solving the Problem

An electronic apparatus according to the present disclosure includes a processing unit capable of setting one of an adjustment position and a numerical value. Further, the electronic apparatus includes a display control unit to display a setting screen of the adjustment position and the numerical value of the electronic apparatus and an operation control unit to change one of the adjustment position and the numerical value.

The display control unit displays a knob that is moved on a slider in accordance with a user operation as the setting screen of one of the adjustment position and the numerical value, and sets a position of the knob as a default position on the slider, when the user operation is not performed.

The operation control unit changes one of the adjustment position and the numerical value depending on a change of the position of the knob by the user operation on the setting screen displayed by the control of the display control unit.

An apparatus operation method according to the present disclosure includes a display process of displaying a setting screen for setting one of an adjustment position and a numerical value on the basis of a user operation and a control process of changing one of the adjustment position and the numerical value depending on a change of a position of a knob by the user operation on the setting screen displayed in the display process.

In the display process, the knob that is moved on the slider by a user operation is displayed, and when the user operation is not performed, the position of the knob is set as a default position on the slider.

A program according to the present disclosure is provided to execute a display step and a control step.

In the display step, a knob that is moved on a slider by a user operation is displayed as a setting screen for setting one of an adjustment position and a numerical value on the basis of the user operation, and a position of the knob is set as a default position on the slider, when the user operation is not performed.

In the control step, one of the adjustment position and the parameter is changed depending on a change of the position of the knob by the user operation on the setting screen displayed by the display step.

According to the present disclosure, the position of the knob that is moved on the slider is shifted to the default position such as the center, when the operation is not performed. When the user operation is performed, the knob is moved from the center position in accordance with the user operation state, and the adjustment position or the numerical value is changed. Therefore, only during the operation for the knob by the user, the adjustment position or the parameter is changed. When the user stops the operation, changing of the adjustment position or the numerical value is stopped.

Effect of the Invention

According to the present disclosure, only during the operation for the knob by the user, the adjustment position or the numerical value of an adjustment target is changed. When the user stops the operation, changing of the adjustment position or the numerical value is stopped. Thus, it is possible to set a preferable operation speed, a preferable operation direction, and the like faithfully reflecting a user's intention and obtain a preferable operability.

MODE(S) FOR CARRYING OUT THE INVENTION

Figure 1:
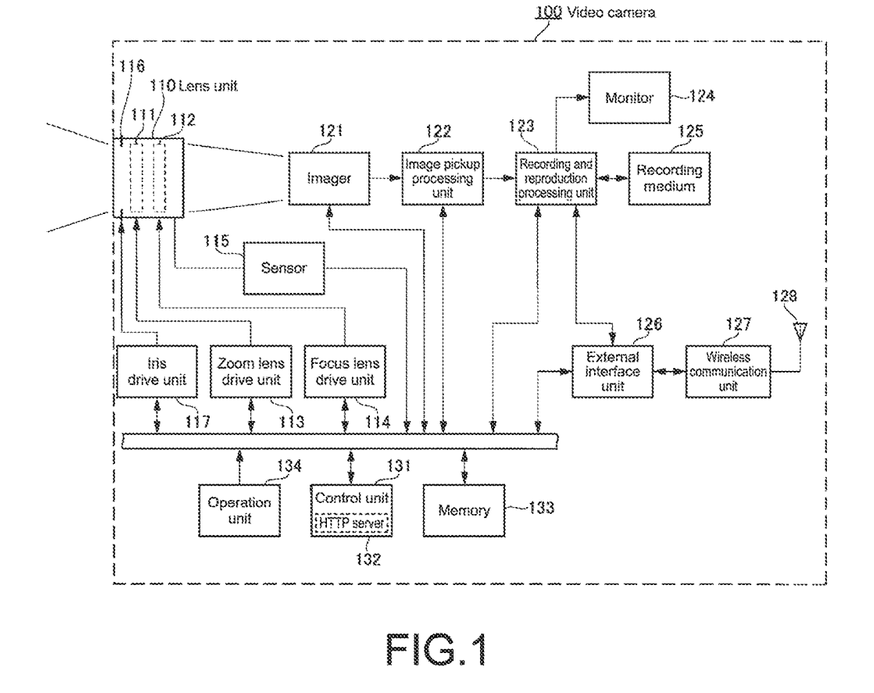
FIG. 1 A block diagram showing an example of the structure of an electronic apparatus (video camera) according to an embodiment of the present disclosure.
Figure 4:
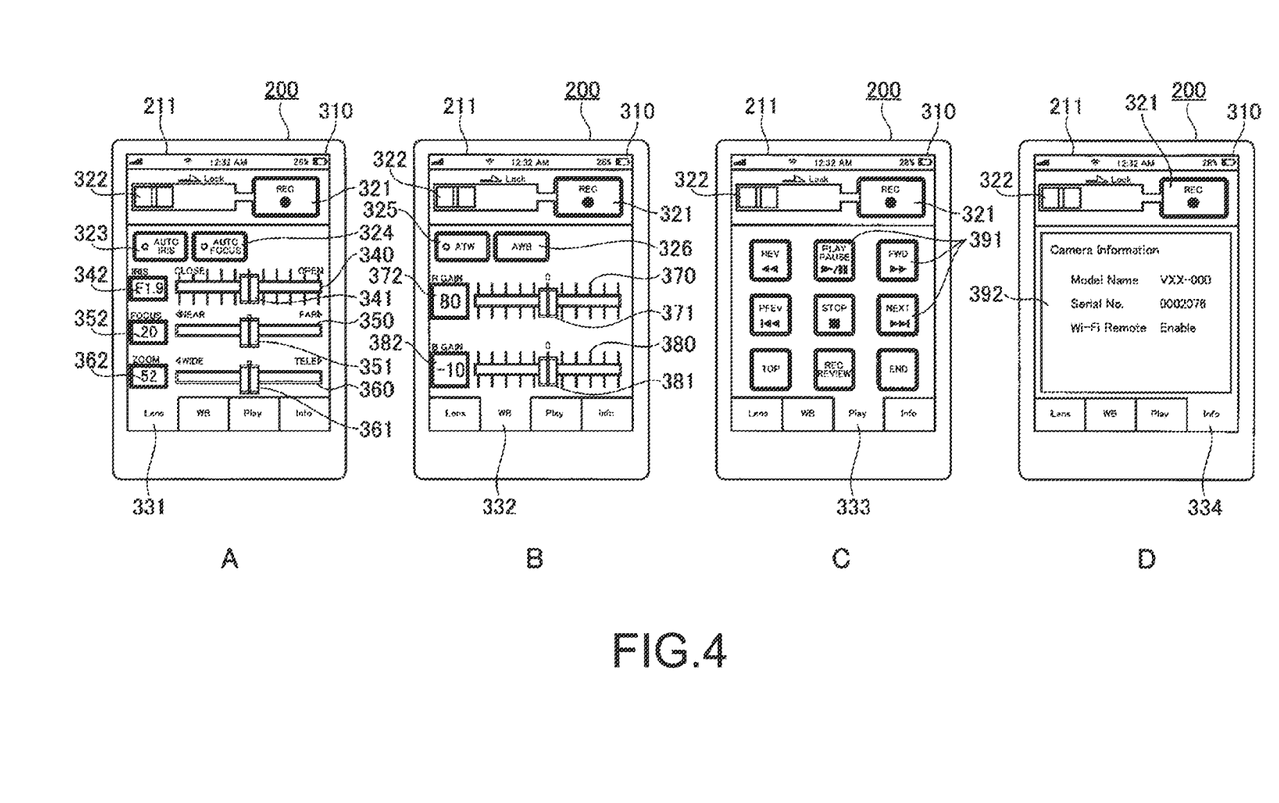
FIG. 4 An explanation diagram showing a display example (Example 1) of an operation screen of the terminal apparatus according to the embodiment of the present disclosure.
Figure 5:
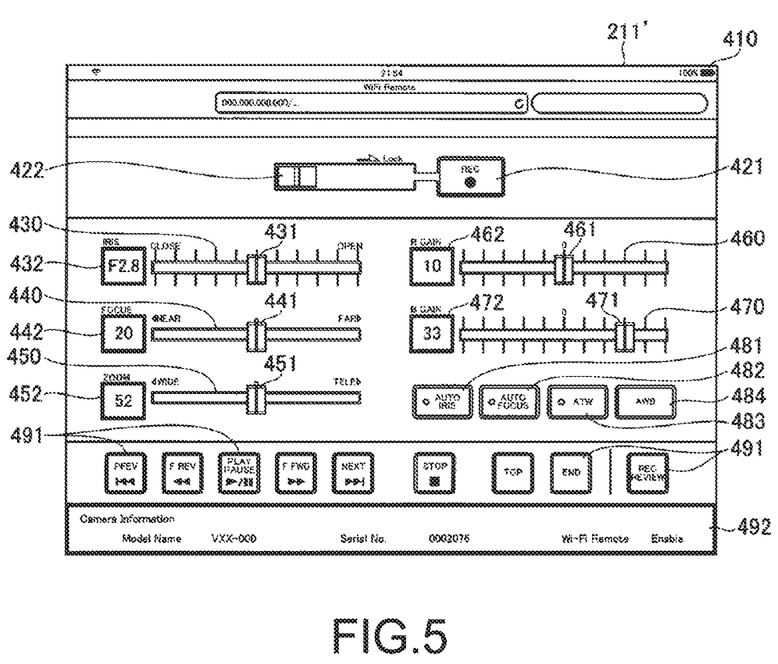
FIG. 5 An explanation diagram showing a display example (Example 2) of an operation screen of the terminal apparatus according to the embodiment of the present disclosure.
Figure 6:
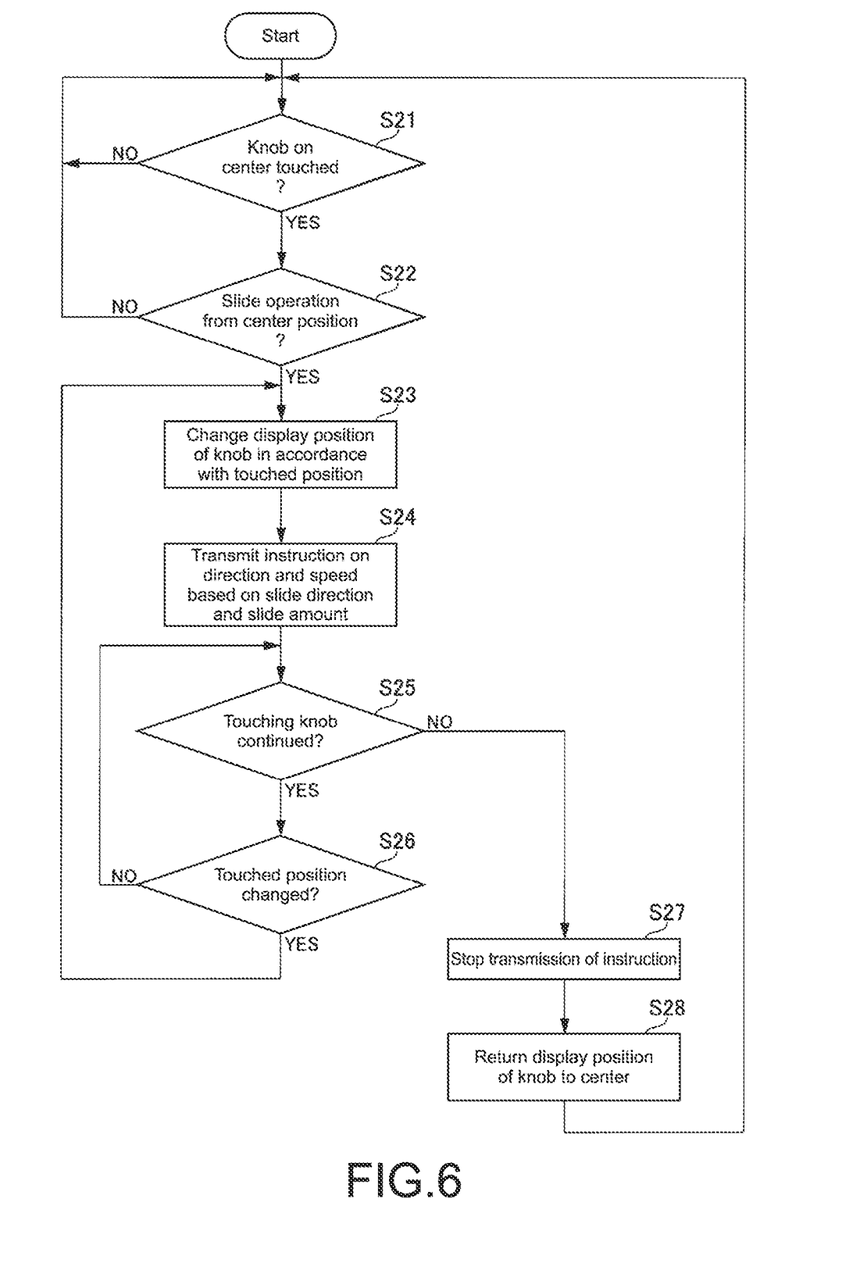
FIG. 6 A flowchart showing an example of a control process (Example 1) according to the embodiment of the present disclosure.
Figure 7:
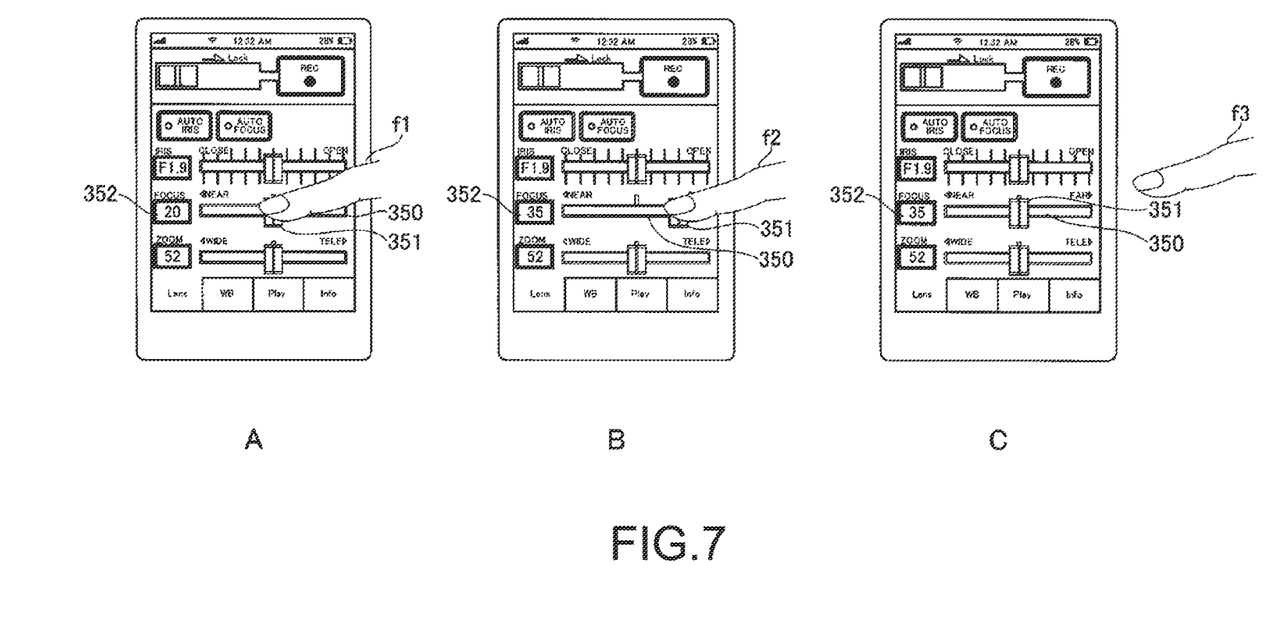
FIG. 7 An explanation diagram showing an example of an operation screen by the example of FIG. 6.
Figure 8:
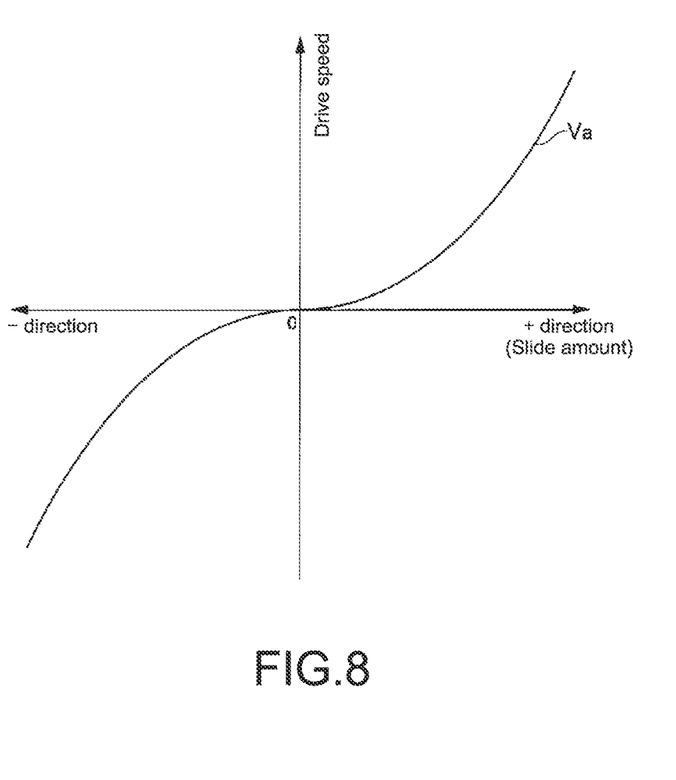
FIG. 8 A characteristic diagram showing an example of a relationship between a slide direction and a drive speed.
Figure 9:
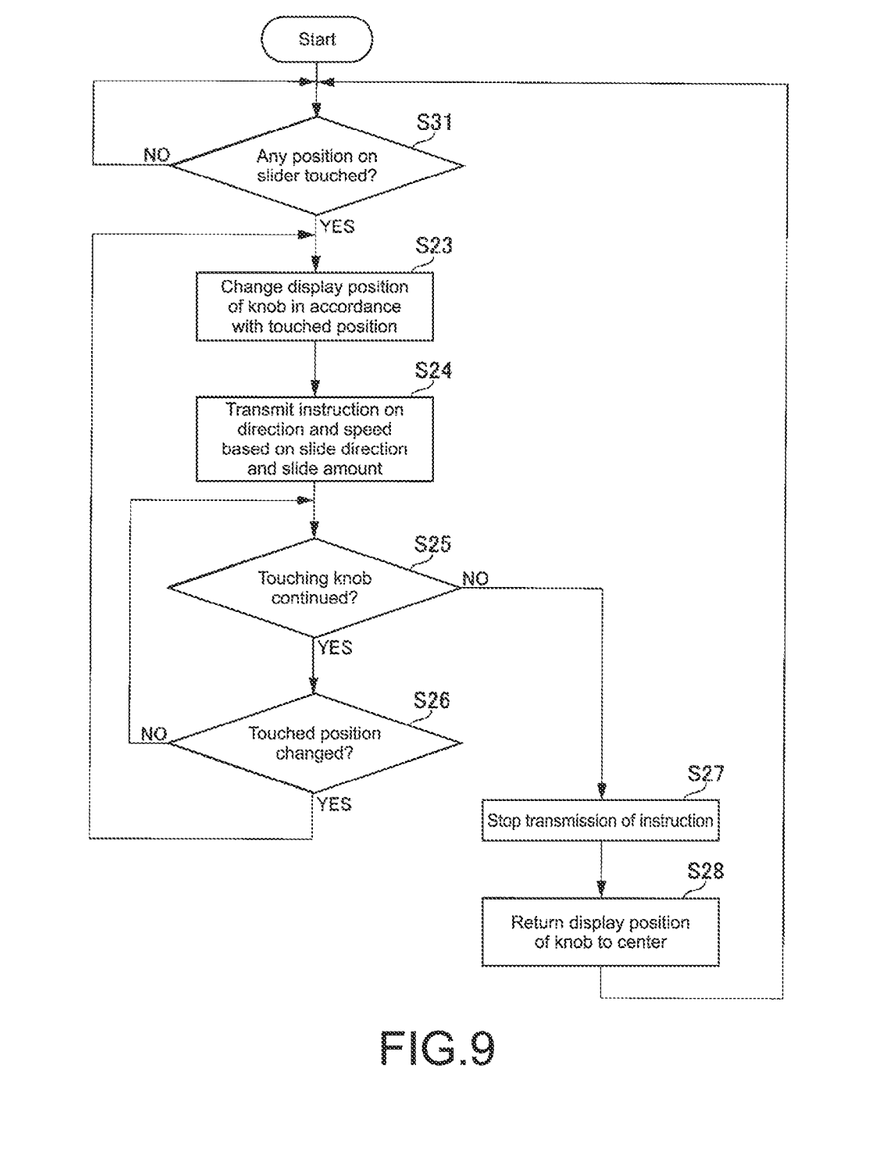
FIG. 9 A flowchart showing an example of a control process (Example 2) according to the embodiment of the present disclosure.
Figure 10:
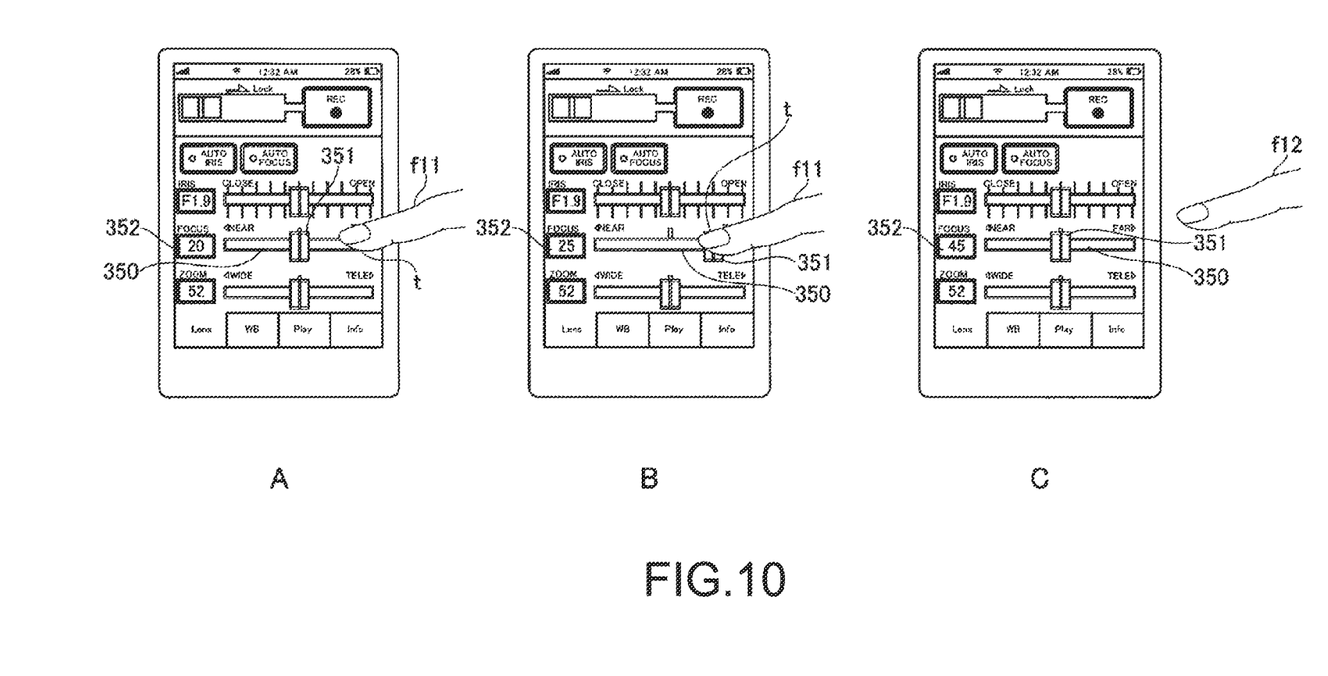
FIG. 10 An explanation diagram showing an example of an operation screen by the example of FIG. 9.

Examples of an electronic apparatus, an apparatus operation method, and a program according to an embodiment of the present disclosure will be given in the following order with reference to the drawings.
1. Example of structure of video camera (FIG. 1)
2. Example of structure of terminal apparatus (FIG. 2)
3. Example of communication state (FIG. 3)
4. Example of operation screen (Example of smart phone: FIG. 4)
5. Example of operation screen (Example of tablet terminal: FIG. 5)
6. Example of process at time of operation by user (Example 1: FIG. 6 to FIG. 8)
7. Example of process at time of operation by user (Example 2: FIG. 9 and FIG. 10)
8. Modified example 1. Example of Structure of Video Camera FIG. 1 is a diagram showing an example of the structure of an electronic apparatus according to an embodiment of the present disclosure. Herein, as the electronic apparatus, the case of using a video camera is given as an example.

A video camera 100 is provided with an imager 121, and image light obtained in a lens unit 110 mounted enters the imager 121. For the imager 121, for example, a CMOS (Complementary Metal Oxide Semiconductor) image sensor or a CCD (Charge Coupled Device) image sensor is used.

The lens unit 110 is provided with a zoom lens 111 and a focus lens 112 which can make a zoom adjustment and a focus adjustment, respectively. The zoom lens 111 is driven by a zoom lens drive unit 113. The focus lens 112 is driven by a focus lens drive unit 114. Further, the video camera 100 is provided with a sensor 115 that detects positions of the zoom lens 111 and the focus lens 112. Further, the lens unit 110 is provided with an iris 116. The iris 116 is driven by an iris drive unit 117.

The drive of the lenses by the zoom lens drive unit 113 and the focus lens drive unit 114 is performed on the basis of instructions from a control unit 131. In this case, speeds at which the drive units 113 and 114 move the positions of the zoom lens 111 and the focus lens 112 are set on the basis of an instruction from the control unit 131.

The drive of the iris by the iris drive unit 117 is performed also on the basis of an instruction from the control unit 131. Further, data of the positions of the zoom lens 111 and the focus lens 112 detected by the sensor 115 is transmitted to the control unit 131.

An image pickup signal obtained by the imager 121 by taking an image is supplied to an image pickup processing unit 122. The image pickup processing unit 122 performs various processings for the image pickup signal and converts the image pickup signal into an image signal with a predetermined format. A white balance adjustment to be described later is also performed by the image pickup processing unit 122. The image signal output from the image pickup processing unit 122 is supplied to a recording and reproduction unit 123, a monitor 124 connected to the recording and reproduction unit 123 displays the image, and a recording medium 125 records the image signal. For the recording medium 125, for example, a hard disk drive apparatus, a memory card in which a semiconductor memory is embedded, or the like is used. Further, the video camera 100 can output the image signal from an output terminal (not shown).

Further, to the recording and reproduction unit 123, through an external interface unit 126, a wireless communication unit 127 is connected. The wireless communication unit 127 is provided with an antenna 128 and performs wireless communication with a communication target within a short distance of approximately several meters to several tens of meters. The wireless communication unit 127 performs the wireless communication in conformity with a standard of a wireless LAN (Local Area Network), for example. The video camera 100 performs the wireless communication by the wireless communication unit 127 and receives instructions and the like for instructing operations of process blocks in the video camera 100. Further, in the video camera 100, the wireless communication unit 127 wirelessly transmits the image signal or the like obtained by taking the image. The communication target with which the wireless communication unit 127 performs the wireless communication may be a terminal apparatus 200 to be described later or may be an access point for the wireless LAN.

The control unit 131 as an operation control unit that controls the operations of the units of the video camera 100 performs communication with the units in the video camera 100 through an internal bus line. The memory 133 stores therein a program necessary to perform a control process by the control unit 131. In this case, the memory 133 also stores therein a program necessary to cause the video camera to function as a server at a time when the video camera 100 performs communication with an external terminal apparatus through the wireless communication unit 127. The control unit 131 executes the program necessary to function as the server, thereby forming an HTTP server 132. The HTTP server 132 is a protocol of HTTP (Hypertext Transfer Protocol) to communicate with a terminal apparatus. In the case of the video camera 100 according to the present disclosure, the HTTP server 132 communicates with an external terminal apparatus, thereby causing the external terminal apparatus to function as a remote controller of the video camera 100. The HTTP server 132 functions as a display control unit that controls display of an operation screen, and the HTTP server 132 transmits data necessary to generate the operation screen to be displayed to the external terminal apparatus.

Further, the video camera 100 is provided with an operation unit 134. The operation unit 134 includes an operation key, a touch panel, or the like. When a user operates the operation unit 134, an operation instruction is transmitted to the control unit 131, and the control unit 131 controls each of the units to be brought into an instructed operation state. In the case where the operation instruction is transmitted from the external terminal apparatus to the HTTP server 132 at a time when the HTTP server 132 communicates with the external terminal apparatus, the control unit 131 also controls each of the units to be in the instructed operation state.

2. Example of Structure of Terminal Apparatus

Figure 2:
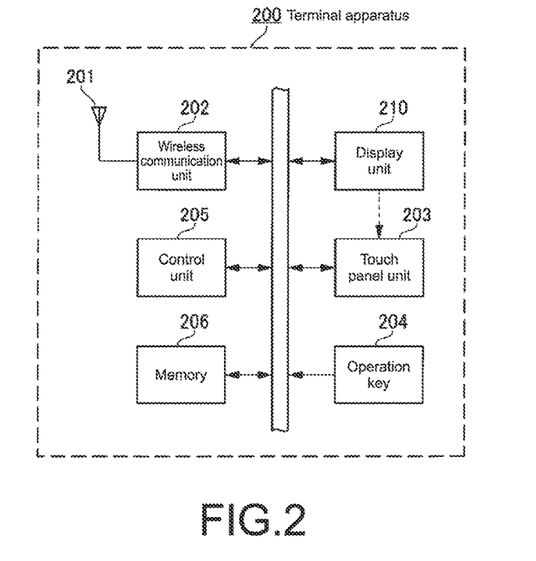
FIG. 2 A block diagram showing an example of the structure of a terminal apparatus according to the embodiment of the present disclosure.

FIG. 2 is a diagram showing an example of the structure of the terminal apparatus 200 as a target with which the video camera 100 performs the wireless communication. The terminal apparatus 200 is a relatively small terminal apparatus called a smart phone in some cases and is a relatively large terminal apparatus provided with a display panel, called a tablet terminal, in the other cases. In both the cases, the same basic structure of the inside of the terminal apparatus 200 is provided, and a major different point is a size of a display panel.

The terminal apparatus 200 is provided with a wireless communication unit 202 to which an antenna 201 is connected. The wireless communication unit 202 performs the wireless communication in conformity with the standard of the wireless LAN. The wireless communication in the wireless communication unit 202 is performed under control of a control unit 205. Further, the control unit 205 controls display of a display unit 210.

The terminal apparatus 200 is provided with a touch panel unit 203, and the touch panel 203 detects that a surface of a display panel 211 (FIG. 4) of the display unit 210 is touched with a finger or a pen. As the touch panel unit 203, for example, a capacitance type is used. A detection signal detected by the touch panel unit 203 is supplied to the control unit 205. It should be noted that the display unit 210 and the touch panel unit 203 may be formed integrally with each other in some cases. Further, the terminal apparatus 200 is provided with an operation unit 204 on which an operation key and the like are disposed. The operation unit 204 may be provided with a touch panel.

The terminal apparatus 200 performs the wireless communication with the video camera 100, for example, and accesses the HTTP server 132 in the video camera 100, thereby causing the terminal apparatus 200 to be function as the remote controller of the video camera 100. That is, the control unit 205 of the terminal apparatus 200 accesses the HTTP server 132 of the video camera 100, and the control unit 205 obtains data necessary to display the operation screen by the display unit 210. At this time, for example, the control unit 205 uses software (program) of a web browser to access the HTTP server 132. Then, the operation screen based on the obtained data is displayed on the display unit 210. The display data of the operation screen is generated by executing the web browser. The operation screen is obtained by reflecting a state of the video camera 100 thereon in real time, and the operation screen displays a value of an adjustment condition or the like.

3. Example of Communication State

Figure 3:
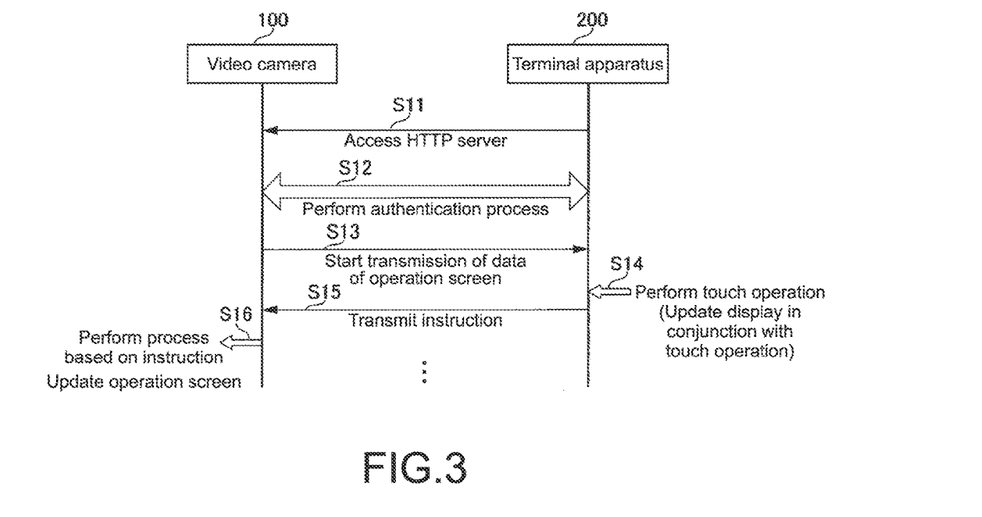
FIG. 3 A sequence diagram showing an example of a communication state between the electronic apparatus and the terminal apparatus according to the embodiment of the present disclosure.

FIG. 3 is a diagram showing a procedure in the case where the wireless communication unit 127 of the video camera 100 and the wireless communication unit 202 of the terminal apparatus 200 perform the wireless communication.

First, the control unit 205 of the terminal apparatus 200 accesses the HTTP server 132 of the video camera 100 (Step S11). After that, the HTTP server 132 and the control unit 205 perform authentication for each other (Step S12). At this time, the HTTP server 132 recognizes details about the terminal apparatus 200 to be accessed. Specifically, the HTTP server 132 determines whether the access is performed from the terminal apparatus provided with a relatively small display panel, called smart phone, or is performed from a terminal apparatus provided with a relatively large display panel, called a tablet terminal. On the basis of the determination, the HTTP server 132 sets the operation screen to be transmitted to the terminal apparatus 200 to a screen corresponding to a specification of the screen of the terminal apparatus 200. Specific examples of the operation screens will be described later.

Upon completion of the authentication process, the HTTP server 132 starts transmission of the data of the operation screen to the terminal apparatus 200 (Step S13). By receiving the data of the operation screen by the terminal apparatus 200, on the display unit 210, the operation screen is displayed.

Then, when the touch panel unit 203 detects a touch operation with respect to a knob or a button displayed on the operation screen (Step S14), the control unit 205 generates an operation instruction based on the detected touch operation and transmits the operation instruction to the HTTP server 132 (Step S15). It should be noted that, when the touch panel unit 203 detects continuous user operations, the operation instructions are transmitted to the HTTP server 132 at constant intervals of approximately 100 msec, for example.

The HTTP server 132 that receives the operation instruction transmits the operation instruction to the control unit 131, and the control unit 131 transmits an instruction corresponding to the operation instruction to the processing units in the video camera 100 (Step S16). The processing units that receive the instruction in the video camera 100 perform processes on the basis of the instruction. For example, when the HTTP server 132 receives an instruction related to a zoom operation, the control unit 131 transmits a zoom lens drive instruction based on the zoom operation instruction to the zoom lens drive unit 113. Further, when the HTTP server 132 receives an instruction related to a focus operation, the control unit 131 transmits a focus lens drive instruction based on the focus operation instruction to the focus lens drive unit 114.

Further, on the basis of the received operation instruction, the HTTP server 132 updates the data of the operation screen to be transmitted to the terminal apparatus 200.

4. Example of Operation Screen

FIG. 4 is a diagram showing an operation screen displayed by the display panel 211 of the terminal apparatus 200. In examples of FIG. 4, shown is the case of the terminal apparatus 200 provided with the relatively small display panel 211, called a smart phone.

In the case of this smart phone, four types of operation screens are displayed depending on display modes. FIGS. 4A to 4D show the four types of operation screens. In the case where any operation screen is displayed, in the display panel 211, on an upper end of the screen, a status bar 310 that indicates a status of the terminal apparatus 200 is displayed. The status bar 310 indicates remaining battery power, current time, a wireless communication status, or the like with graphics, numerals, or the like. A display content of the status bar 310 is updated by the control unit 205 of the terminal apparatus 200. A display content of a display part other than the status bar 310 is updated on the basis of data transmitted from the video camera 100.

FIG. 4A is a lens operation screen. The lens operation screen is displayed when a user performs a touch operation to a lens tab 331 on a lower side of the screen. On an upper side of the lens operation screen, a recording key 321 and a lock key 322 are displayed. The recording key 321 is a key for giving an instruction to start and stop recording. The lock key 322 is a key for giving an instruction to lock and unlock the recording key 321. The touch position of the lock key 322 is slid rightwards by the user, thereby giving an instruction of locking or unlocking. The recording key 321 and the lock key 322 are displayed in any mode in which one of the four types of the operation screens is displayed.

Further, the lens operation screen displays an auto iris key 323, an auto focus key 324, an iris adjustment slider 340, a focus adjustment slider 350, and a zoom adjustment slider 360. Further, the lens operation screen displays an iris adjustment value display unit 342, a focus adjustment value display unit 352, and a zoom adjustment value display unit 362. These adjustment value display units 342, 352, and 362 are disposed on the left sides of the sliders 340, 350, and 360, respectively. The iris adjustment value display unit 342 displays an F value. The focus adjustment value display unit 352 and the zoom adjustment value display unit 362 each display a value corresponding to a lens position detected by the sensor 115. The values of the lens position fall within a range of, for example, 0 to 99, thereby showing an index of the focus adjustment state or the zoom adjustment state. Alternatively, in the case where the sensor 115 can detect a focus distance of the focus lens and a focal length of the zoom lens, those values may be displayed by the adjustment value display units 352 and 362.

When the auto iris key 323 is selected by the touch operation by the user, the video camera 100 automatically sets an adjustment value of the iris 116 of the lens unit 110. When the auto focus key 324 is selected by the touch operation by the user, the video camera 100 automatically sets an adjustment value of the focus lens 112 of the lens unit 110.

On the iris adjustment slider 340, a knob 341 is displayed. A display position of the knob 341 on the iris adjustment slider 340 corresponds to the adjustment state of the iris 116. The iris adjustment slider 340 has scales at constant intervals.

In the example of FIG. 4A, the knob 341 is disposed approximately on the center on the iris adjustment slider 340, but depending on the adjustment state of the iris 116, the position of the knob 341 on the iris adjustment slider changes. Therefore, as shown in FIG. 4A, the case where the knob 341 is disposed on the center is just an example, and depending on the adjustment state of the iris 116, the position of the knob 341 changes at any time.

It should be noted that, in the case where the user operation of the auto iris key 323 sets an auto iris mode, the knob 341 on the iris adjustment slider 340 is displayed with a lower brightness than one really is. By displaying the knob 341 with the lower brightness in this way, the fact that a current mode is a mode in which the user operation for the iris cannot be performed is indicated.

The focus adjustment slider 350 indicates a knob 351. In the state in which the user operation is not performed, the knob 351 is disposed on a default position as a reference on the center of the focus adjustment slider 350. Further, when the user performs a dragging operation of sliding the knob 351 from the default position, the focus lens 112 is driven in accordance with a direction in which the knob 351 is moved and an amount of the movement. When the user stops the touch operation of the knob 351, the display position of the knob 351 is returned to the default position, and the drive of the focus lens 112 is stopped.

It should be noted that, in the case where the auto focus mode is set by the user operation for the auto focus key 324, the knob 351 on the focus adjustment slider 350 is displayed with a lower brightness than one really is. By displaying the knob 351 with the lower brightness in this way, the fact that a current mode is a mode in which the user operation for the focus cannot be performed is indicated.

The zoom adjustment slider 360 indicates a knob 361. In the state in which the user operation is not performed, the knob 361 is disposed on a specific position (default position) on the center of the zoom adjustment slider 360. Further, when the user performs a dragging operation of sliding the knob 361 from the default position, the zoom lens 111 is driven in accordance with a direction in which the knob 361 is moved and an amount of the movement. When the user stops the touch operation of the knob 361, the display position of the knob 361 is returned to the default position, the drive of the zoom lens 111 is stopped, and the zoom lens 111 is stopped at a position at a time when the touch operation is stopped. For the focus adjustment slider 350 and the zoom adjustment slider 360, scales at constant intervals are not provided, but only marks that indicate the default positions are provided.

It should be noted that, the operation at the time of the touch operation for the knobs 351 and 361 will be described in detail with a flowchart shown in FIG. 6.

FIG. 4B shows a white balance operation screen. The white balance operation screen is displayed when the user performs a touch operation to a white balance tab 332 on a lower side of the screen. The white balance operation screen displays an auto tracking white balance (ATW) key 325, an auto while balance (ATW) key 325, an R gain adjustment slider 370, and a B gain adjustment slider 380. Further, the white balance operation screen displays an R gain adjustment value display unit 372 and a B gain adjustment value display unit 382. These adjustment value display units 372 and 382 are disposed on the left side of the B gain adjustment slider 380.

The R gain adjustment slider 370 indicates a knob 371, and the display position of the knob 371 on the R gain adjustment slider 370 corresponds to an adjustment state of an R gain. The B gain adjustment slider 380 indicates a knob 381, and the display position of the knob 381 on the B gain adjustment slider 380 corresponds to an adjustment state of the gain. The R gain adjustment slider 370 and the B gain adjustment slider 380 each have scales at constant intervals.

FIG. 4C shows a reproduction operation screen. The reproduction operation screen is displayed when the user performs a touch operation to a reproduction tab 333 on the lower side of the screen. On the reproduction operation screen, a plurality of reproduction operation keys 391 for indicating various reproduction states, reproduction and stop, and the like of the image signals recorded by the recording medium 125 of the video camera 100 are displayed.

FIG. 4D shows an information screen. The information screen is displayed when the user performs a touch operation to an information tab 334 on the lower side of the screen. The information screen is provided with an information portion 392 that indicates a model name, a serial number, and the like of the video camera 100 of a communication target. The information portion 392 also indicates information relating to whether it is possible to perform remote control for the video camera 100 or not.

5. Example of Operation Screen

FIG. 5 shows an example of the operation screen in the case where the terminal apparatus 200 that performs the wireless communication with the video camera 100 is a tablet terminal.

In the case of the tablet terminal, a relatively large display panel 211' is provided thereto, so one operation screen performs all the indications. That is, in the case of the tablet terminal, the four operation screens for the smart phone shown in FIGS. 4A to 4D are compiled into one to be displayed.

Specifically, on the display panel 211', on an upper end of the screen, a status bar 410 that shows the status of the terminal apparatus 200 is displayed. Further, a recording key 421 and a lock key 422 are displayed.

Further, on the display panel 211', an iris adjustment slider 430, a focus adjustment slider 440, a zoom adjustment slider 450, an R gain adjustment slider 460, and a B gain adjustment slider 470 are displayed. The adjustment sliders 430, 440, 450, 460, and 470 indicate knobs 431, 441, 451, 461, and 471 are displayed, respectively.

It should be noted that, for each of the knob 441 of the focus adjustment slider 440 and the knob 451 of the zoom adjustment slider 450, the center on the slider is set as a default position, and only when the user performs the drag operation, the knobs are moved from the default position.

On the left side of the adjustment sliders 430, 440, 450, 460, and 470, adjustment value display units 342, 442, 452, 462, and 472 are displayed, respectively.

Further, on the display panel 211', an auto iris key 481, an auto focus key 482, an auto tracking white balance key 483, and an auto white balance key 484 are displayed.

Further, on the display panel 211', a plurality of reproduction operation keys 491 and an information portion 492 are displayed.

6. Example of Process at Time of Operation by User: Example 1

Subsequently, on the basis of the flowchart shown in FIG. 6, a description will be given on a process example (Example 1) in the case where the user touches and operates the operation screen.

Here, the case where the knob 351 of the focus adjustment slider 350 in the lens operation screen shown in FIG. 4A is touched by the user is given. It should be noted that, in the case where the knob 361 on the zoom adjustment slider 360 in the lens operation screen shown in FIG. 4A is touched by the user, the same process operation is carried out.

First, the control unit 205 of the terminal apparatus 200 determines whether the knob 351 on the default position on the center of the focus adjustment slider 350 is touched with a finger or the like of the user or not (Step S21). In this determination, in the case where it is determined that the knob 351 is not touched, the focus adjustment is not made on standby.

In Step S21, when it is determined that the knob is touched, the control unit 205 determines whether the dragging operation for sliding the touched position along the focus adjustment slider 350 from the default position (center position) is performed or not (Step S22). In the case where the dragging operation is not performed, the control unit 205 is returned to the determination in Step S21.

In Step S22, in the case where it is determined that the dragging operation is performed, the control unit 205 causes the display position of the knob 351 on the focus adjustment slider 350 to be changed with the change of the touched position of the dragging operation (Step S23). Further, on the basis of the direction in which the dragging operation is performed from the center and the amount of sliding of the dragging operation, the control unit 205 generates an instruction for instructing the direction and the speed and transmits the instruction to the video camera 100 (Step S24). The transmission of the instruction is performed at constant intervals (for example, 100 msec) during the touch operation.

After that, the control unit 205 determines whether touching the knob 351 by the user is continued or not (Step S25). When the control unit 205 determines that the touching is continued, the control unit 205 determines whether the touch position is changed or not (Step S26). In the case where the touch position is not changed, the control unit 205 returns to the determination in Step S25. Further, in the case where it is determined that the touch position is changed in Step S26, the control unit 205 returns to the determination in Step S23.

Then, in Step S25, when it is determined that the touching the knob 351 is ended, the control unit 205 stops the transmission of the instruction to the video camera 100 (Step S27). Further, on the basis of the instruction from the HTTP server 132 of the video camera 100, the display position of the knob 351 is returned to the fault position on the center (Step S28). After that, the control unit 205 returns to the determination in Step S21.

In an example of the display shown in FIG. 7A, the state is shown in which the knob 351 on the default position on the center of the focus adjustment slider 350 is touched with a finger f1 of the user. When the finger f1 touches the display position of the knob 351, the control unit 205 shifts from Step S21 to the determination of Step S22.

In an example of the display shown in FIG. 7b, the state is shown in which the touch position of finger f2 is slid rightwards along the focus adjustment slider 350 with the default position as a standard point. In this way, when the touch position is slid, such a focus adjustment instruction that the focus adjustment position of the focus lens 112 is in the + direction (far in this case) at a speed corresponding to the amount of slide is transmitted from the terminal apparatus 200 to the video camera 100. In the case where the touch position is slid from the center in an opposite direction to the direction in the example of FIG. 7B, such a focus adjustment instruction that the focus adjustment position of the focus lens 112 is in the − direction (near in this case) is transmitted.

In the state shown in FIG. 7B, when the touch position with the finger of the user is changed, the speed and the direction of the focus adjustment instruction is changed in accordance with the touch position.

In an example of the display shown in FIG. 7c, the state is shown in which a finger f3 of the user is released from the screen. At the same time when the finger f3 of the user is released from the screen, the transmission of the focus adjustment instruction is stopped. Then, as shown in FIG. 7C, the position of the knob 351 is automatically returned to the default position. At this time, the knob 351 is gradually moved from the slid position shown in FIG. 7B to the default position for a slight period of time (for example, approximately 0.5 second). In this way, it takes some time to cause the knob 351 to return to the original default position, with the result that the user easily grasp the movement of the knob 351, resulting in a good display status. Further, the transmission of the focus adjustment instruction is stopped at the same time when the finger f3 of the user is released from the screen, so it is possible to make an accurate adjustment to obtain a state as intended by the user. Therefore, the video camera 100 can obtain the same operability by using the touch panel as in the case where a mechanical adjustment lever is provided.

It should be noted that, when the finger f3 of the user is released from the screen, the knob 351 may be immediately returned to the original default position. Further, by a mode switching through the user operation, the speed at the time when the knob 351 is returned to the original default position may be freely adjustable.

Further, FIG. 7C shows that the state in which when the finger f3 of the user is released from the screen, the knob 351 is returned to the default position. However, when the position on the screen which is touched with the finger f3 of the user is outside of the display position of the knob 351, the knob 351 is also returned to the default position.

FIG. 8 is a diagram showing a characteristic Va between an amount of movement on the screen at a time when the knob 351 is moved from the default position (center position) on the focus adjustment slider 350 by the touch operation and a drive speed of the focus lens 112 by the focus lens drive unit 114.

The lateral axis shown in FIG. 8 indicates the amount of shift (shift distance) of the knob 351 from the center position (position at 0). The vertical axis shown in FIG. 8 indicates the drive speed of the focus lens 112 set on the basis of an instruction in each of the amounts of shift. The drive direction of the focus lens 112 is opposite with respect to the center position.

As shown as the characteristic Va in FIG. 8, the farther the knob is positioned from the center position, the faster the drive speed becomes gradually. Conversely, the nearer the knob is positioned from the center position, the slower the drive speed becomes. By setting the characteristic Va having the curve as described above, it is possible to achieve both of a moving operation to a far focus position at high speed and an operation of making a delicate focus adjustment in the vicinity of a focus point or the like.

The speed change characteristic Va of the curve shown in FIG. 8 is merely an example. For example, such a characteristic that the amount of shift and the drive speed are linearly changed may be used.

It should be noted that, from FIG. 6 to FIG. 8, the operation at the time when the user operates the focus adjustment slider 350 on the operation screen, but the same operation is performed also when the user operates the zoom adjustment slider 360 on the operation screen. That is, the knob 361 on the zoom adjustment slider 360 is also displayed on the center position in the state in which the user operation is not performed. When the user operation of sliding the knob 361 from the center position is carried out, the terminal apparatus 200 transmits a zoom adjustment instruction for giving an instruction on the drive speed and the drive direction of the zoom lens 111. Further, when a finger of the user is released from the operation screen, the terminal apparatus 200 stops the output of the zoom adjustment instruction and performs a process of returning the display position of the knob 361 to the center position.

By such application to the zoom operation as described above, it is possible to make an accurate adjustment to obtain a zoom state as intended by the user.

For the other adjustment sliders 340, 370, and 380 shown in FIG. 4, the knob 341, 371, 381 are disposed to indicate the adjustment states at that time. In the case of FIG. 4, whether the slider has the knob which is returned to the default position can be distinguished from existence or nonexistence of scales on the slider.

To the operation on the operation screen for a tablet terminal shown in FIG. 5, the same process is applied. That is, for the focus adjustment slider 440 and the zoom adjustment slider 450 in the operation screen for the tablet terminal shown in FIG. 5, the process of the flowchart shown in FIG. 6 is performed. For the adjustment sliders 430, 460, and 470 excluding the focus adjustment slider 440 and the zoom adjustment slider 450, the knobs 431, 461, 471 are disposed to indicate the adjustment states at that time.

7. Example of Process at Time of Operation by User: Example 2

Subsequently, on the basis of a flowchart shown in FIG. 9 and an example of a display shown in FIG. 10, a description will be given on an example (Example 2) of a process in the case where the user touches and operates the operation screen. In the flowchart shown in FIG. 9, to the same steps as in the flowchart of FIG. 6, the same step numbers are given.

In the case of Example 1, the user touches the knob 351 at the default position on the focus adjustment slider 350 first, with the result that the position of the knob 351 can be moved. On the other hand, in the case of Example 2, in the state where the knob 351 is disposed on the default position on the focus adjustment slider 350, when the user touches any position on the focus adjustment slider 350, the knob 351 is moved to the touch position.

That is, as shown in FIG. 9, the control unit 205 of the terminal apparatus 200 determines whether a finger or the like of the user touches any position on the focus adjustment slider 350 or not (Step S31). In the case where it is determined that any position on the focus adjustment slider 350 is not touched, the focus adjustment is not performed and stands by.

In the case where it is determined that any position on the focus adjustment slider 350 is touched in Step S31, the control unit 205 changes the display position of the knob 351 on the focus adjustment slider 350 to a position touched (Step S23). At this time, the knob 351 is immediately moved from the default position to the touch position, for example. Alternatively, it may take some time to cause the knob 351 to move from the default position to the touch position.

Steps subsequent to Step S23 are the same as in the flowchart of FIG. 6.

The example of the display shown in FIG. 10A shows the state in which a specific position other than the center on the focus adjustment slider 350 is touched by a finger f11 of the user. In this way, when the touching with the finger f11 occurs, the control unit 205 performs the touch detection in Step S31.

when the touch detection in the state shown in FIG. 10A is performed, the operation screen is changed into the state shown in FIG. 10B. That is, the display position of the knob 351 is changed to a touch position t on the focus adjustment slider 350. A focus adjustment instruction on a direction and a speed corresponding to the position of the knob 351 at this time is transmitted from the terminal apparatus 200 to the video camera 100.

A process in the case where the finger of the user is released from the operation screen is the same as in Example 1 shown in FIG. 7.

That is, as shown in FIG. 10C, at the same time when a finger f12 of the user is released from screen, the transmission of the focus adjustment instruction is stopped. Then, as shown in FIG. 10C, the position of the knob 351 is automatically returned to the default position. At this time, the knob 351 is gradually moved by using a predetermined time period from the slid position shown in FIG. 10B to the default position. Alternatively, when the finger f12 of the user is released from the screen, the knob 351 is set to be immediately returned to the default position.

In the case of Example 2 explained with reference to FIG. 9 and FIG. 10, it is unnecessary to perform an operation of sliding the knob 351 first. Therefore, in the case of Example 2, a more quick operation than the case of Example 1 can be performed. However, only by touching the position on the focus adjustment slider 350 with the finger, the operation is immediately performed, so an erroneous operation may be performed. Thus, it is desirable that one of the process of Example 1 and the process of Example 2 can be selected by a user operation.

That is, setting is performed to make the selection of operation modes possible. When a first mode is selected, the control unit 205 performs the process of the flowchart shown in FIG. 6. When a second mode is selected, the control unit 205 performs the process of the flowchart shown in FIG. 9. The selection can be performed as described above, with the result that the terminal apparatus 200 provides user's favorite operability.

8. Modified Example

It should be noted that in the example of the above embodiment, to the process in the case where the display panel 211 of the terminal apparatus 200 that performs remote control for the video camera 100 displays the operation screen, the technology of the present disclosure is applied. However, for example, the operation unit 134 of the video camera 100 may be provided with a display panel having a touch pane, and on the display panel of the video camera main body, the same operation screen may be displayed. In this case, for example, under the control of the control unit 131 of the video camera 100, the operation screen is displayed.

Further, in the example of the above embodiment, the video camera 100 is provided with the control unit 131 that functions as the HTTP server 132, and by using the program of the web browser held by the terminal apparatus 200, the terminal apparatus 200 accesses the HTTP server 132. However, the terminal apparatus or a computer apparatus may have a dedicated program for remote control, and an apparatus to which the program is loaded may operate as a remote controller. In this case, the program may execute the processes shown in FIG. 6 and FIG. 9.

The HTTP server 132 provided to the control unit 131 is also merely an example, and a server that performs communication with another protocol may be used. For example, a server of such a type as to be accessed by executing a dedicated program for remote control may be prepared.

Further, in the example of the above embodiment, the technology of the present disclosure is applied to the displaying of the operation screen in the case where the zoom lens 111 and the focus lens 112 of the lens unit 110 of the video camera 100 are adjusted. However, the technology may be applied to the operation screen at a time when another position or parameter is adjusted.

For example, when the user uses a clock function provided to the electronic apparatus to input numerical values of current time, reservation time, or the like, a control unit of the clock causes a time adjustment slider like the focus adjustment slider 350 to be displayed. Then, the control unit of the clock sets a direction and a speed at which the time changes in accordance with the amount of shift of the knob on the slider from the default position.

When numerical values such as various parameters other than the time are set, the same process may also be applied.

By such a setting, it is possible to easily input various numerical values by touching the operation screen.

Further, in the example of the above embodiment, the example in which the user touches the operation screen with the finger is described. However, a dedicated touch pen or the like may be used to touch the operation screen. Further, by a method other than the touch operation, the knob or the like on the operation screen may be selected.

For example, to the terminal apparatus 200, a pointing device such as a mouse is connected. Then, when the knob 351 or the like of the focus adjustment slider 350 is selected by a setting of a cursor position on the screen with the pointing device and a dragging operation after a click operation, the process in the flowchart shown in FIG. 6 is performed. As a result, the process in the present disclosure can be applied to a terminal apparatus or a computer apparatus in which a display unit is not provided with a touch panel.

Further, in the above embodiment, the application to the operation of the video camera as the electronic apparatus is given as an example. However, the application to other various electronic apparatuses may be performed. For the terminal apparatus, the application to a terminal apparatus other than the smart phone and the tablet terminal may be carried out. For example, a personal computer apparatus may be applied to the terminal apparatus.

It should be noted that the present disclosure can take the following configuration.

(1) An electronic apparatus, including:

a processing unit capable of setting one of an adjustment position and a numerical value;

a display control unit to display a knob that is moved on a slider in accordance with a user operation as a setting screen of one of the adjustment position and the numerical value, and set a position of the knob as a default position on the slider, when the user operation is not performed; and an operation control unit to change one of the adjustment position and the numerical value depending on a change of the position of the knob by the user operation on the setting screen displayed by the control of the display control unit.

(2) The electronic apparatus according to (1) above, in which the processing unit is a lens drive unit that sets one of a zoom position of a zoom lens and a focus position of a focus lens.

(3) The electronic apparatus according to (1) or (2) above, in which on the setting screen displayed by the control of the display control unit, after one of a touch detection and a click operation for the knob on the default position is performed, a dragging operation is performed on the slider with the position where one of the touch detection and the click operation is performed as a base point, thereby changing the position of the knob.

(4) The electronic apparatus according to (3) above, in which the operation control unit stops changing one of the adjustment position and the numerical value immediately when the dragging operation is not performed, and the display control unit returns a display position of the knob to the default position on the slider by using a predetermined time period, when the dragging operation is not performed.

(5) The electronic apparatus according to any one of (1) to (4) above, in which on the setting screen displayed by the control of the display control unit, one of a touch detection and a click operation detection on the slider is performed, thereby changing the position of the knob to a position where the detection is performed.

(6) The electronic apparatus according to any one of (1) to (5) above, in which in accordance with an amount of shift of the knob from the default position, the operation control unit changes one of the adjustment position and a changing speed of a parameter.

(7) The electronic apparatus according to any one of (1) to (6) above, in which the display control unit is a server function unit that causes the setting screen to be displayed on a display unit provided to an external terminal apparatus during communication therewith.

(8) An apparatus operation method, including:

a display process of displaying a knob that is moved on a slider by a user operation as a setting screen for setting one of an adjustment position and a numerical value on the basis of the user operation, and setting a position of the knob as a default position on the slider, when the user operation is not performed; and a control process of changing one of the adjustment position and the numerical value depending on a change of the position of the knob by the user operation on the setting screen displayed in the display process.

(9) A program for causing a computer to execute:

a display step of displaying a knob that is moved on a slider by a user operation as a setting screen for setting one of an adjustment position and a numerical value on the basis of the user operation, and setting a position of the knob as a default position on the slider, when the user operation is not performed; and a control step of changing one of the adjustment position and the numerical value depending on a change of the position of the knob by the user operation on the setting screen displayed by the display step.

Further, the structures and processes described in the claims of the present invention are not limited to the examples in the above embodiment. It should be understood by those skilled in the art that various modifications, combinations, and alterations may occur insofar as they are within the gist of the present invention.

DESCRIPTION OF REFERENCE NUMERALS 100 video camera
110 lens unit
111 zoom lens
112 focus lens
113 zoom lens drive unit
114 focus lens drive unit
115 sensor
121 imager
122 image pickup processing unit
123 recording reproduction unit
124 monitor
125 recording medium
126 external interface unit
127 wireless communication unit
128 antenna
131 control unit
132 HTTP server
133 memory
134 operation unit
200 terminal apparatus
201 antenna
202 wireless communication unit
203 touch panel unit
204 operation key
205 control unit
206 memory
210 display unit
211, 211' display panel
340 iris adjustment slider
341 knob
342 iris adjustment value display unit
350 focus adjustment slider
351 knob
352 focus adjustment value display unit
360 zoom adjustment slider
361 knob
362 zoom adjustment value display unit
430 iris adjustment slider
431 knob
432 iris adjustment value display unit
440 focus adjustment slider
441 knob
442 focus adjustment value display unit
450 zoom adjustment slider
451 knob
452 zoom adjustment value display unit

The invention claimed is:

1. An electronic apparatus, comprising:
a control unit configured for sending command instructions to control an operating state of a camera connected directly with the electronic apparatus via a wireless communication link, the electronic apparatus receiving via the wireless communication link an image signal of an image recorded by the camera; and
a display unit, including a touch panel unit, configured for displaying to a user an operation screen responsive to a user's operation of the electronic apparatus, the operation screen displaying a switching operation area in which is displayed a corresponding one of plural operation screens depending upon the user's operation, the plural operation screens comprising a zoom operation screen configured to enable the user to adjust a zoom operation in the camera, and a reproduction operation screen configured to control the reproduction of an image recorded by the camera, wherein the reproduction operation screen includes a reproduction control area configured to control a start of the reproduction of the image recorded by the camera, at least one of the operation screens displaying a visual representation of a slider and a function element movable along the slider, the control unit causing the display unit to display the function element at a default position along the slider and determining when an object touches the touch panel at the default position of the function element and is dragged in a direction along the slider to an end position to cause the display unit to move the function element along the slider from the default position to the end position as the object is dragged, the control unit configured to generate a command instruction to change the operating state of the camera in accordance with the direction in which the function element moves, the operating state being a speed of change of a state of the camera, wherein the operating state is determined based on an amount determined by a distance between the default position and the end position, the control unit further configured to produce a stop instruction when the object is removed from the touch panel to cause the display unit to return the function element along the slider to the default position but not change the operating state of the camera during the return of the function element to the default position.

2. The electronic apparatus of claim 1, wherein the camera includes a lens drive unit that drives a focus lens in response to command instructions.

3. The electronic apparatus of claim 1, wherein the camera includes a lens drive unit that drives a zoom lens in response to command instructions.

4. The electronic apparatus of claim 1, wherein the default position is the center position of the slider.

5. The electronic apparatus of claim 1, wherein the slider has terminal points and the function element is movable to respective ones of the terminal points.

6. The electronic apparatus of claim 1, wherein the speed at which the operating state of the camera changes increases as the distance between the default position and the end position of the function element increases.

7. The electronic apparatus of claim 1, wherein the display unit is further configured for displaying to the user information corresponding to the operating state of the camera.

8. The electronic apparatus of claim 1, wherein the end position is the position reached by the function element at the time the object is removed from the touch panel.

9. The electronic apparatus of claim 1, wherein the control unit causes the display unit to move the function element to a position along the slider at a position at which the object touches the touch panel.

10. The electronic apparatus of claim 1, wherein the display unit is further configured for displaying to the user numerical values representing the zoom operation.

11. The electronic apparatus of claim 10, wherein the numerical values are determined by the distance between the default position and the end position of the function element.

12. A method for controlling an operating state of a camera in accordance with command instructions, the camera being connected directly with electronic apparatus via a wireless communication link, the electronic apparatus receiving via the wireless communication link an image signal of an image recorded by the camera comprising:
sending command instructions to the camera;
displaying to a user an operation screen responsive to a user's operation of the electronic apparatus, the operation screen displaying a switching operation area in which is displayed a corresponding one of plural operation screens depending upon the user's operation, the plural operation screens comprising a zoom operation screen configured to enable the user to adjust a zoom operation in the target unit, and a reproduction operation screen configured to control the reproduction of an image recorded by the camera, wherein the reproduction operation screen includes a reproduction control area configured to control a start of the reproduction of the image recorded by the camera, at least one of the operation screens displaying a visual representation of a slider and a function element that moves along the slider from a default position when an object touches a touch panel and is dragged in a direction along the touch panel to an end position;
generating command instructions to change the operating state of the camera in accordance with the direction in which the function element moves, the operating state being a speed of change of a state of the camera, wherein the operating state is determined based on an amount determined by a distance between the default position and the end position; and
producing a stop instruction when the object is removed from the touch panel to display a return of the function element along the slider to the default position but not change the operating state of the camera during the return of the function element to the default position.

13. A non-transitory computer-readable storage medium for storing a program that, when read by a processor in an electronic apparatus, causes the processor to control an operating state of a camera connected directly with the electronic apparatus via a wireless communication link, the electronic apparatus receiving via the wireless communication link an image signal of an image recorded by the camera, the program, when executed, controls a method, comprising:
sending command instructions to the camera;
displaying to a user an operation screen responsive to a user's operation of the electronic apparatus, the operation screen displaying a switching operation area in which is displayed a corresponding one of plural operation screens depending upon the user's operation, the plural operation screens comprising a zoom operation screen configured to enable the user to adjust a zoom operation in the target unit, and a reproduction operation screen configured to control the reproduction of an image recorded by the camera, wherein the reproduction operation screen includes a reproduction control area configured to control a start of the reproduction of the image recorded by the camera, at least one of the operation screens displaying a visual representation of a slider and a function element that moves along the slider from a default position when an object touches a touch panel and is dragged in a direction along the touch panel to an end position;
generating command instructions to change the operating state of the camera in accordance with the direction in which the function element moves, the operating state being at a speed of change of a state of the camera, wherein the operating state is determined based on an amount determined by a distance between the default position and the end position; and
producing a stop instruction when the object is removed from the touch panel to display a return of the function element along the slider to the default position but not change the operating state of the camera during the return of the function element to the default position.

* * * * *